(12) United States Patent
Fredette et al.

(10) Patent No.: US 7,038,329 B1
(45) Date of Patent: May 2, 2006

(54) QUALITY POWER FROM INDUCTION GENERATOR FEEDING VARIABLE SPEED MOTORS

(75) Inventors: Steven J. Fredette, South Windsor, CT (US); Rishi Grover, Vernon, CT (US)

(73) Assignee: UTC Power, LLC, South Windsor, CT (US)

( * ) Notice: Subject to any disclaimer, the term of this patent is extended or adjusted under 35 U.S.C. 154(b) by 33 days.

(21) Appl. No.: 10/982,628

(22) Filed: Nov. 4, 2004

(51) Int. Cl.
*F02D 29/06* (2006.01)

(52) U.S. Cl. .................... 290/40 C; 318/438; 307/127

(58) Field of Classification Search ............... None
See application file for complete search history.

(56) References Cited

U.S. PATENT DOCUMENTS

| | | | | | |
|---|---|---|---|---|---|
| 511,376 | A | * | 12/1893 | Mehl | 324/145 |
| 3,727,103 | A | * | 4/1973 | Finch et al. | 361/30 |
| 4,461,986 | A | * | 7/1984 | Maynard et al. | 318/728 |
| 5,373,196 | A | * | 12/1994 | Faley | 307/46 |
| 5,585,708 | A | * | 12/1996 | Richardson et al. | 318/800 |
| 6,219,623 | B1 | * | 4/2001 | Wills | 702/60 |
| 6,386,719 | B1 | * | 5/2002 | Lee | 359/879 |
| 6,979,914 | B1 | * | 12/2005 | McKelvey et al. | 290/40 C |
| 2004/0264082 | A1 | * | 12/2004 | Suliman et al. | 361/62 |
| 2005/0122082 | A1 | * | 6/2005 | Eckardt | 318/800 |
| 2005/0253551 | A1 | * | 11/2005 | Koellner | 318/830 |
| 2005/0276020 | A1 | * | 12/2005 | Ahmad | 361/698 |

FOREIGN PATENT DOCUMENTS

| | | | |
|---|---|---|---|
| DE | 3333631 A1 | * | 4/1985 |
| GB | 2052185 A | * | 1/1981 |

* cited by examiner

*Primary Examiner*—Joseph Waks
(74) *Attorney, Agent, or Firm*—M. P. Williams

(57) ABSTRACT

A prime mover (28) in a heat recovery system drives an induction generator (8) which feeds power to a utility grid (9) through a breaker (10) but also powers a load including auxiliary induction motors (11, 12). To provide acceptable waveform and power factor, the auxiliary equipment is driven through IGBT switched bridge converters (13) by DC voltage (15) generated by an IGBT switched bridge converter (13a), instead of three-phase diode rectifiers (16). The switched bridge converter controller (14a) is responsive to a system process controller (23a) which causes the switched bridge controller (13a) to be driven in response to the voltage (26) and current (27) on the generator bus (17). This eliminates the need for harmonic filters (18) and power factor capacitors (20) while improving the quality of the power generated. The controller (23a) trips the breaker if the voltage, frequency or power factor is out of limits.

6 Claims, 2 Drawing Sheets

QUALITY POWER FROM INDUCTION GENERATOR FEEDING VARIABLE SPEED MOTORS

TECHNICAL FIELD

This invention relates to providing power to a utility power grid from an induction generator which also provides power to variable speed motor drives associated therewith, such as in combined heat and power systems; the power factor and harmonics content (shape) of the power at the grid interface is controlled to be well within requirements for power provided to the utility, by actively controlling power in a manner to complement and compensate for undesirable harmonics and power factor.

BACKGROUND ART

It has become common for entities other than power utilities to generate electric power and to provide it to the utility grid, thereby to derive revenue or offset customer electric utility bills. Recapture and utilization of energy (such as heat) which would otherwise be wasted, as a byproduct of some useful function, is becoming commonplace.

In some electric power generating systems, the manner of harnessing the energy that will operate the generator may require auxiliary equipment, such as pumps and fans. An example is a combined heat and power system which recovers waste heat, such as from food processing plants or landfills utilizing an organic Rankin cycle system as disclosed in publication US 2004/0088985A1. In such a system, a compressible fluid has heat added and rejected at constant pressure along with isotropic expansion and compression, as is well known. The process may be organic, in which the working fluid changes states, or there may be a process in which a working fluid does not change states.

For economic efficiency, it is desirable that a low cost generator provide power for all auxiliary equipment, while at the same time presenting power which has shape (without harmonic distortion), power factor and frequency that are all suitable for interface with the utility power grid. Synchronous generators are expensive and require additional controls compared with other, cheaper generators such as induction generators, in which the rotor consists of simple conductive bars, short-circuited at the ends, which is much less expensive than synchronous generators. However, induction generators have an inherently lower power factor than what is acceptable to utility grids.

As a specific example of harmonic distortion, consider an electric power generator 8, shown in FIG. 1, which produces 270 kW, connected to a grid 9 by breakers 10 and to auxiliary variable speed motors 11, 12 which consume 70 kW total. The net power available for supply to the grid 9 is 200 kW. The variable speed motors 11, 12 are powered by insulated gate bipolar transistor (IGBT) switched bridge converters 13, having switching controllers 14, the DC input of which 15 is provided by three-phase diode rectifiers 16, as is illustrated in FIG. 1.

A typical best case harmonic distortion of current at the utility grid 9, due to the auxiliary apparatus 11–16, may be on the order of 32%. This amounts to about 8% distortion of the 200 kW being generated at the utility interface. Typical requirements of a power utility include harmonic distortion of less than 5%. Although harmonic filter traps 18 attached to the power bus 17 may be used, they will be application-specific, requiring tuning in each case—that is, in each application design. Apparatus on the grid 9 may interact with the filter traps 18, so that the filter traps will be absorbing harmonic energy from the grid, thereby stressing the components above the intended rating. The filter traps may result in the power factor to be more lagging. Harmonic filter traps also increase the cost and space requirements of the installation where used.

The use of variable speed motors 11, 12 driven by an induction generator causes the power factor to be very lagging, and thus lower than that typically required by a utility (ranging between 0.85 and 0.95). This may be corrected by large power factor correcting capacitors 20, which increase the cost of the system, consume space, and are possible sources for self-excitation, all of which can be inappropriate in many installations. These capacitors may require additional bulky series inductors for limiting harmonic current to the capacitors.

Another requirement for providing generated power to a utility power grid is referred to as "anti-islanding", which requires that the power generator be disconnected from the grid whenever the voltage, frequency or power factor become out of certain limits. This may be accommodated by monitoring power factor, since any differences between the voltage or the phase of the generated power and that on the power utility grid will alter the power factor sufficiently to be detectable, and cause tripping of interconnection breakers.

DISCLOSURE OF INVENTION

Objects of the invention include: producing quality power with a generator; producing quality electric power in a system having auxiliary variable speed motors associated with and powered by the generator, without degrading the quality of generated power which may be applied to a power utility grid; correction of power factor without the use of power factor correcting capacitors; producing well-shaped electric power with low harmonic distortion in a system employing an inexpensive induction generator associated with auxiliary variable speed motors; improved heat recovery; improved generation of electric power in an organic Rankin cycle heat recovery system; generating electrical power with low harmonic distortion, high power factor, and suitable anti-islanding in an organic Rankin cycle heat recovery system including variable speed induction motors as auxiliary equipment therein; and improved electric power generation having low harmonic distortion, high power factor and anti-islanding protection.

According to the present invention, an electric power generator which provides power to at least one related, auxiliary variable speed motor, as well as providing power to a power utility grid, employs an insulated gate bi-polar transistor (IGBT) switched bridge converter (SBC) to provide DC power input to at least one IGBT SBC which drives the variable speed motor.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
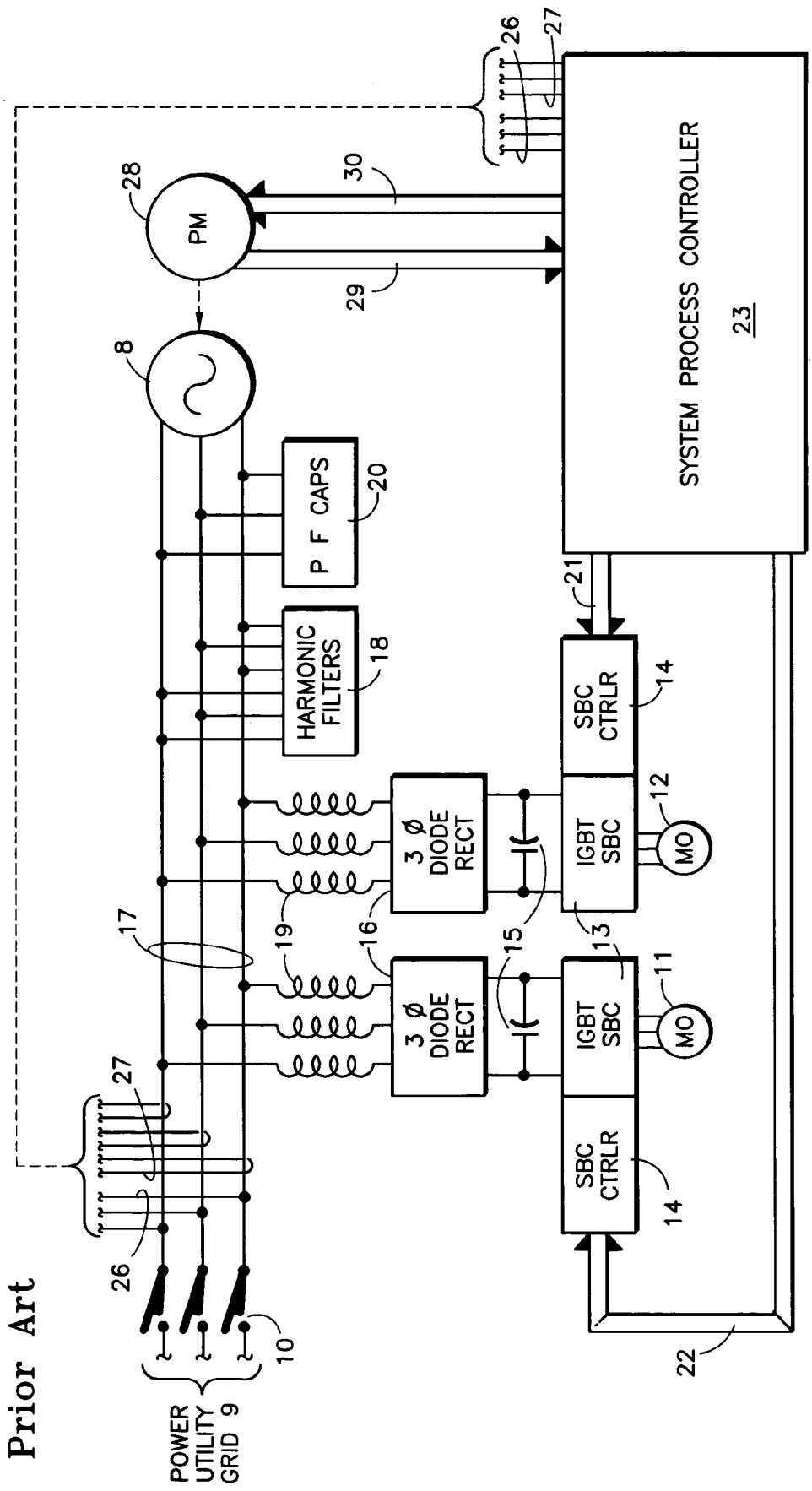
FIG. 1 is a simplified schematic block diagram of an exemplary electric power generation system driven by a prime mover and powering variable speed motors with DC power from a diode bridge converter, as well as providing power to a power utility grid, known to the prior art.

Referring to FIG. 1, one known system utilizes three-phase diode rectifiers 16 to provide the DC voltage 15 at the input to the IGBT converters 13. The converter controllers 14 respond to signals 21, 22 from a system process controller 23. The controller 23 responds to current and voltage signals 26, 27 indicative of the power generated by the electric power generator 8, including magnitude of power and power factor. The controller 23 also responds to signals 29 from whatever is the prime mover 28, and provides controlling signals 30 to the prime mover. The prime mover may, for instance, be a heat recovery device, such as an organic Rankin cycle heat recovery device.

The diode rectifiers draw current from the bus 17 in separated pulses of opposite phase, which equates to a highly distorted, semi-sine wave. Inductors 19 cause the current drawn by the rectifiers 16 to be more nearly sinusoidal, but not sufficiently to provide an acceptable waveshape on the bus 17 in order for power to be supplied to the grid 9.

Figure 2:
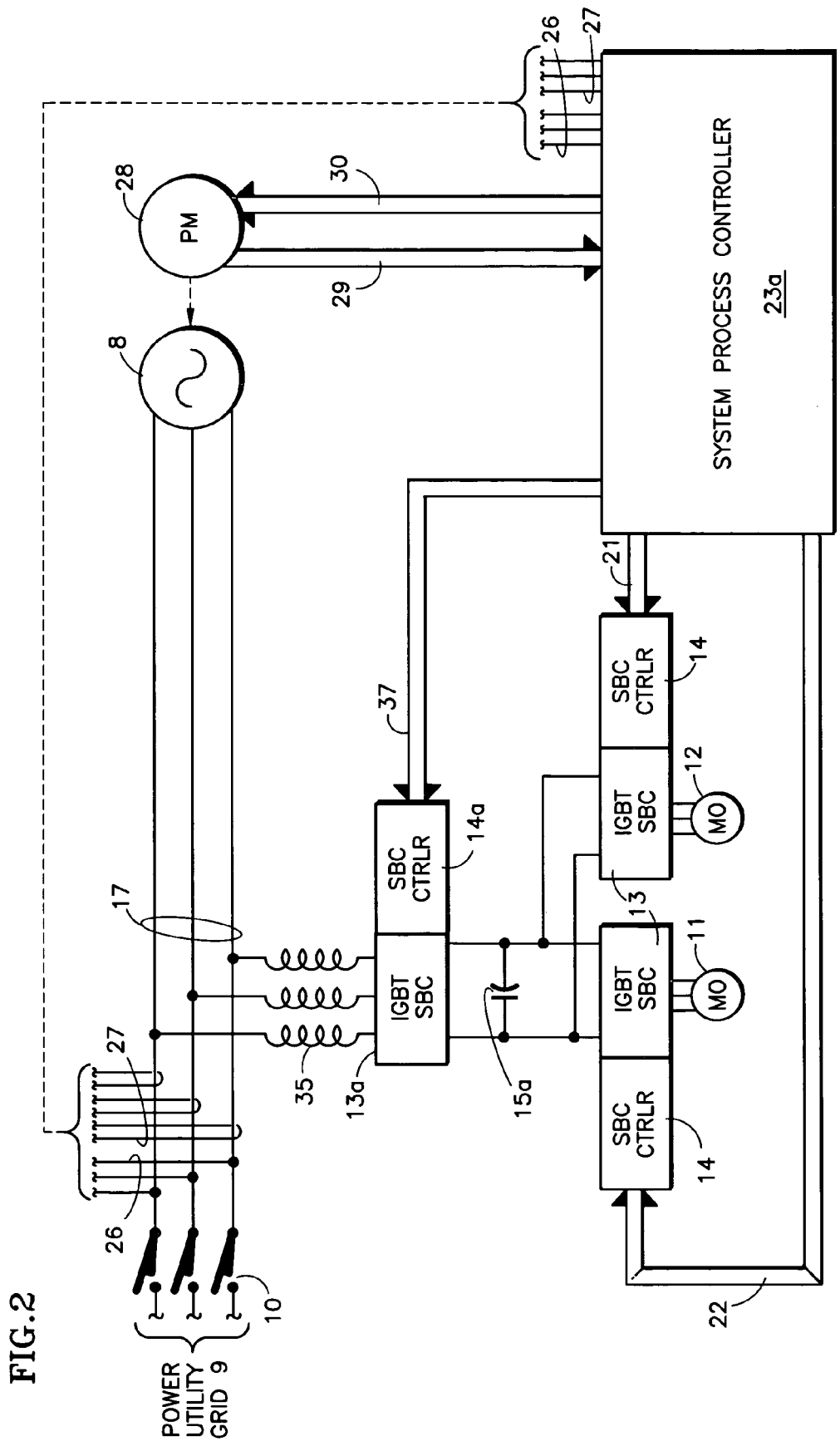
FIG. 2 is a simplified schematic block diagram of one example of the invention, which provides the IGBT switch bridge converters of the motors with DC power from an IGBT switch bridge converter instead of from a diode bridge converter.

Referring to FIG. 2, the present invention accommodates all the aforementioned concerns with respect to harmonic distortion, power factor, and anti-islanding by means of an IGBT switched bridge converter (SBC) 13a, the switching of which is controlled by an SBC controller 14a. The SBC 13a includes line inductors 35 which are required in order to control current and provide a boost function to the DC link 15a. In FIG. 2, the system process controller 23a responds to signals 27 indicative of current on the bus 17 and signals 26 indicative of voltage on the bus 17. The invention may be used with any suitable prime mover driving the generator 8.

The general algorithms are well known and widely published. In accordance with the invention, these algorithms may be tailored in a known fashion in order to achieve the results which are specifically desired when employing the invention.

The system process controller 23a will generate a commanded power setpoint, in accordance with the nature of the specific equipment, and or customer factors, etc. In addition, the system process controller will generate a commanded power factor correction, depending upon the power factor which is desired for power applied to the grid 9, versus the power factor indicated by the voltage and current of power on the bus 17. In addition, the commanded power factor correction may include a dither so that the actual power factor applied to the grid may be, for instance, between about 0.90 and 0.95. If the voltage, frequency or power factor indicated by the signals 26, 27 goes above or below set limits, that is an indication that the generation system of the invention is islanding; this will cause breakers 10 to trip in a conventional fashion.

Another method for preventing anti-islanding is to vary the real power used by parasitic (internal) loads. For example, one of the loads in the system (such as motors 11, 12) may be a sub sub-system of 20 fans powered from a controller. The real power used by the fans could be varied dynamically by 5 KW once each interval of between a fraction of a second and several seconds, preferably every two seconds. This would prevent the induction generator based system from becoming tuned to external loads, as the real and reactive power from the system will never be matched to any external load. Thus in case of a grid outage, the system will not "island".

The commands from the controller 23a on lines 37 are developed in a fashion which causes the DC voltage 15a to be developed while providing a proper, well-shaped sine wave on the bus 17 which is in phase with the grid 9. The system process controller tells the SBC controllers what power and power factor to operate at; the SBC controllers then run the SBCs. The breaker 10 will open when there is a fault on the system, or if the dithering of the power factor causes either voltage, frequency or power factor to become out of a certain range. Excitation of the induction generator stator requires volt/ampere reactive power support from either the utility grid or the volt/ampere reactive power sources within the system of FIG. 2.

The aforementioned publication is incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. An electrical power generating and utilizing system, comprising:
    a prime mover;
    a three-phase induction generator rotated by said prime mover and providing electric power on a three-phase bus;
    said three-phase bus having a load and also being connectable to a three-phase grid by a three-phase circuit breaker;
    said load including at least one induction motor;
    at least one first insulated gate bipolar transistor switched bridge converter providing three-phase power to said at least one induction motor;
    at least one second insulated gate bipolar transistor switched bridge converter connected to said bus and controlled to provide DC power to said at least one first switched bridge converter; and
    a controller responsive to voltage and current on said bus to control said at least one second switched bridge converter to provide said DC voltage to said at least one first switched bridge converter while increasing the power factor of the power on said bus and not distorting the waveform of electric power on said bus.

2. A system according to claim 1 wherein:
    said controller controls said at least one second switched bridge converter to dither the power factor of electric power on said bus within limits, said controller determining actual power factor in response to said voltage and current on said bus and causing said circuit breaker to trip if the determined voltage, frequency or power factor is other than within said limits as indicated by said power factor.

3. A system according to claim 1 wherein:
    said load is controlled to vary the real power which it consumes by several kilowatts once in each interval of between a fraction of a second and several seconds.

4. A method of generating and utilizing electrical power in a system including a prime mover, a three-phase induction generator rotated by said prime mover and providing electric power on a three-phase bus, said three-phase bus having a load and also being connectable to a three-phase grid by a three-phase circuit breaker, said load including at last one induction motor and at least one first insulated gate bipolar transistor switched bridge converter providing three-phase power to said at least one induction motor; said method comprising:

provideing DC power to said at least one first switched bridge converter from at least one second insulated gate bipolar transistor switched bridge converter connected to said bus; and controlling said at least one second switched bridge converter in response to voltage and current on said bus to provide said DC voltage to said at least one first switched bridge converter while increasing the power factor of the power on said bus and not distorting the waveform of electric power on said bus.

5. A method according to claim 4 further comprising:

controlling said at least one second switched bridge converter to dither the power factor of electric power on said bus within limits, by determining actual power factor in response to said voltage and current on said bus and causing said circuit breaker to trip if the determined voltage, frequency or power factor is other than within said limits as indicated by said power factor.

6. A method according to claim 4 further comprising:

controlling said load to vary the real power which it consumes by several kilowatts once in each interval of between a fraction of a second and several seconds.

* * * * *